UNITED STATES PATENT OFFICE.

JOHN McDOUGALL, OF LONDON, ENGLAND.

IMPROVEMENT IN FERTILIZERS.

Specification forming part of Letters Patent No. 135,995, dated February 18, 1873.

*To all whom it may concern:*

Be it known that I, JOHN McDOUGALL, of London, England, of the firm of McDougall Brothers, of Manchester and London, in the Kingdom of Great Britain, Manufacturing Chemists, have invented Improvements in the Manufacture of Manures, of which the following is a specification:

This invention has for its object the absorption, by means of acid superphosphate of lime made, by the addition of sulphuric acid, to phosphatic substances, of the ammonia and salts of ammonia contained in the gases and vapors arising from the destructive distillation of carbonaceous substances.

I employ an acid superphosphate of lime, prepared by the addition of sulphuric acid to phosphatic substances, and either mix with it sawdust or any light porous material, or not, as may be found necessary to admit of the passage through it of the gases and vapors arising from the destructive distillation of carbonaceous substances. The ammonia is absorbed, and the acid superphosphate of lime is changed into precipitated phosphate of lime and sulphate of ammonia, and is in this condition well adapted for use as a manure. As, however, the precipitated phosphate is not regarded by all buyers as equal in market value to soluble phosphate, I add, when desirable, a quantity of sulphuric acid to the product thus obtained to render the precipitated phosphate of lime again soluble, and thus obtain a mixture of soluble phosphate of lime and sulphate of ammonia, which is a readily saleable and valuable manure.

I will now describe the method I prefer of carrying out my invention.

I make acid superphosphate of lime by the addition of sulphuric acid to phosphatic substances, and, if not sufficiently porous or light to admit of gas and vapors passing through freely, I mix with it sufficient sawdust or other suitable light porous material. If intended for the absorption of the ammonia contained in ordinary coal-gas it is placed in the ordinary purifiers in use at gas-works, in one or more layers. While the gas is passing through the ammonia is absorbed by the acid superphosphate, which thereby becomes changed into precipitated phosphate of lime and sulphate of ammonia, and is in this condition well adapted for use as a manure.

I would observe that I am aware that it has been proposed to employ a combination of phosphate of lime and a metal, such as iron, for the purpose of removing both sulphuretted hydrogen and ammonia from gas; but that process could not be rendered commercially remunerative, as the resulting product would in any case have been of very small manurial value.

When the invention is intended to be employed for the absorption of ammonia in other processes, such as the utilization of the ammoniacal liquor resulting from the washing of gas, and ordinarily called "gas liquor," the following is one method that may be employed: The ammonia is driven off by any suitable means, viz., by heating the ammoniacal solution, by applying heat externally to a retort or vessel containing the said gas or ammoniacal liquor, or by passing thereinto a jet of steam, as is well understood, and the ammonia or ammoniacal products are passed through or over the acid superphosphate exposed in suitable chambers on shelves or perforated trays contained in a chamber, so arranged as that the gases and products may have free ingress and egress.

When much moisture is driven off or over with the ammonia it may be desirable to condense as much of the moisture as convenient before it passes through or over the superphosphate, and for such purpose suitable condensing apparatus is employed.

Claims.

1. The absorption of ammonia contained in gases or vapors arising from the destructive distillation of carbonaceous or ammoniacal substances, or from gas liquor or other ammoniacal liquors resulting from such destructive distillation, by the employment of an acid superphosphate of lime, for use as a manure.

2. The addition of sulphuric acid to the product, as above obtained, for the purpose of rendering the phosphate again soluble.

In witness whereof I have signed my name to this specification in the presence of two subscribing witnesses.

JOHN McDOUGALL.

Witnesses:
JOSEPH MOORE,
    61 *Grosvenor Road, Stockwell.*
JAS. S. BENNING,
    32 *Neville Road, Stoke Newington.*